United States Patent Office 3,270,585
Patented Sept. 6, 1966

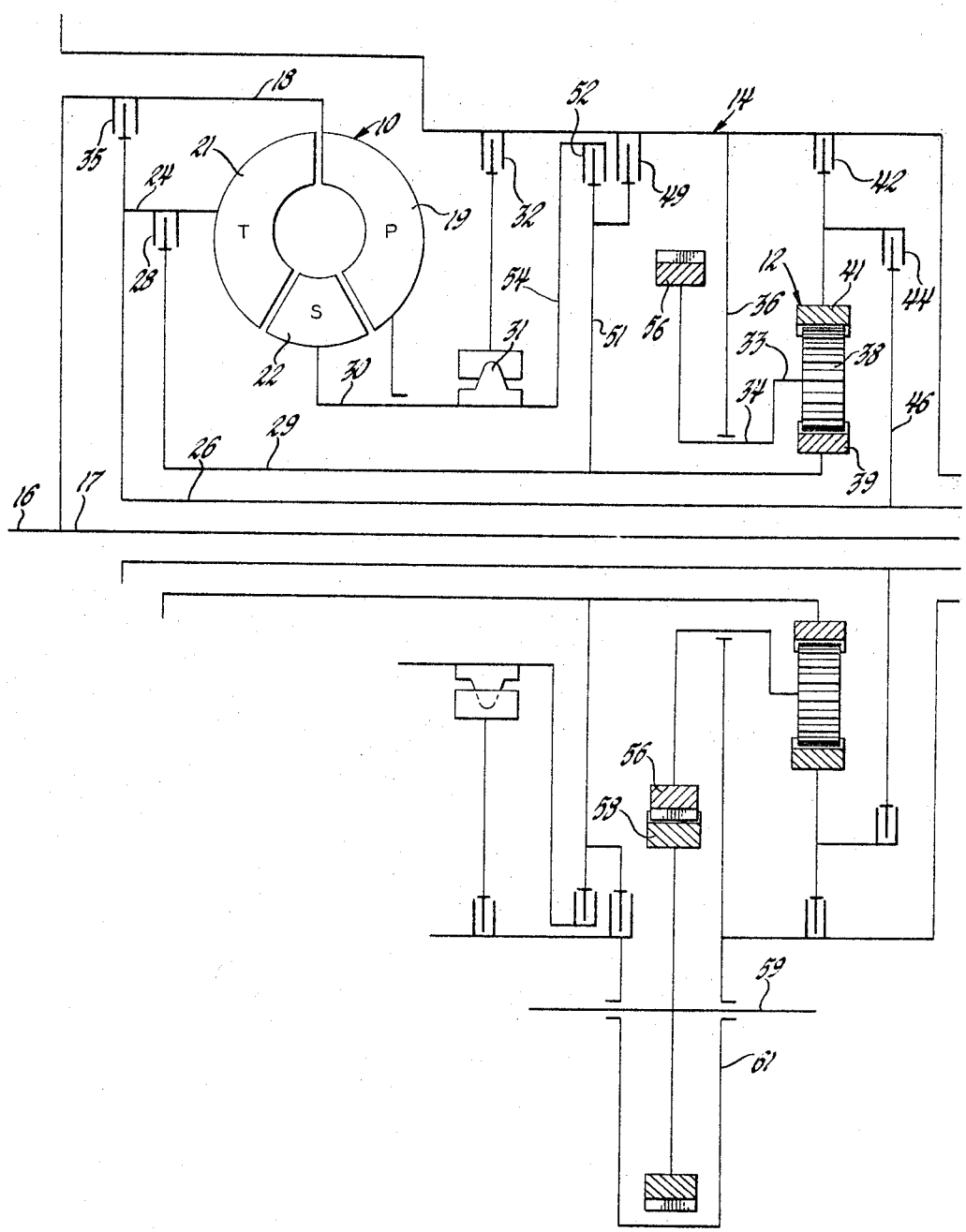

3,270,585
TRANSMISSION
William G. Livezey, Indianapolis, Ind., assignor to General Motors Corporation, Detroit, Mich., a corporation of Delaware
Filed Apr. 15, 1964, Ser. No. 359,894
20 Claims. (Cl. 74—677)

This invention relates to transmissions and more particularly to automotive vehicle transmissions employing hydrodynamic torque converters and range gearing especially adaptable for multiple power take-offs.

It has been found desirable in small delivery trucks, tractors, light military vehicles of the jeep class, for example, and the like, that the transmission transmitting drive from the prime mover via a transmission output to the road-driving wheels be capable of providing a multiple of speed and torque ranges for efficient power flow during drive operation, providing the multiple speed and torque ranges with few range gearing elements, be compact and be adaptable to multiple power take-offs such as prime mover and turbine power take-off without added gearing. Another desirable feature is a transmission output taken off of the side of the transmission which is especially advantageous in front wheel drive arrangements and in transmissions rearwardly mounted in vehicles having rear wheel drive.

The transmission of this invention provides the above-desired features among other features which will subsequently become more apparent and basically comprises a prime mover driven hydrodynamic torque converter having a pump, a turbine and a stator, and a single planetary gear set functioning to provide at least three forward speeds and reverse. Input to the transmission from the prime mover is directly connected to the pump and to a prime mover take-off shaft which extends through a first sleeve shaft. The turbine is directly connected to the first sleeve shaft to provide a turbine power take-off and transmission drive via a selectively engagable clutch to the ring gear of the planetary gear set. The turbine may also be connected via a selectively engageable clutch to a second sleeve shaft which drives the sun gear of the planetary gear set and is fitted over the first sleeve shaft. The planetary pinions of the planetary gear set mesh with the sun gear and the ring gear and are mounted on an output planet carrier through which the first and second sleeve shafts and prime mover take-off shaft extend. The output planet carrier is drivingly connected at a point intermediate the torque converter and planetary gear set to drive through a gear train an off-the-side transmission output shaft parallel to and spaced from the prime mover take-off shaft and the first and second sleeve shafts. The ring gear may be held stationary by a selectively engageable brake. The stator is held against reverse rotation by a one-way brake when the one-way brake is grounded by a selectively engageable brake and the one-way brake when grounded may also hold the sun gear against reverse rotation when the one-way brake is connected via a selectively engageable clutch to the sun gear. Another selectively engageable brake when engaged holds the sun gear stationary when this gear is clutched to the stator for downhill braking by converter braking action to the prime mover with converter churn brake action in addition being afforded since the stator is also held and prevented from overrunning. A converter lockup clutch is also provided which when engaged connects the turbine to the pump for economy of operation.

In operation, to establish the first and lowest forward drive range which provides the greatest torque multiplication and speed reduction, the stator is grounded for forward drive operation of the turbine and the ring gear is braked. The turbine is clutched to the second sleeve shaft to drive the sun gear, the output planet carrier is thereby driven forwardly at a reduced speed and output may be derived at the transmission output shaft, at the prime take-off shaft which is rotating at prime mover speed and at the first sleeve shaft which is rotating at turbine speed.

The second forward drive range is an intermediate drive range and is established by grounding the stator for forward drive operation of the turbine and clutching the sun gear to the grounded one-way brake to hold the sun gear against reverse rotation. The turbine driven first sleeve shaft is clutched to the ring gear to drive the ring gear, the output planet carrier is thereby driven forwardly at a reduced speed in a speed range higher than that provided in the first forward drive range and output may be derived at the transmission output shaft, at the prime mover power take-off shaft and at the first sleeve shaft which is rotating at turbine speed. When downhill braking by the prime mover and the torque converter in this speed range is desired, the sun gear and the stator are braked to prevent their overrunning which would otherwise occur since the one-way brake only prevents reverse rotation.

The third forward drive range is the highest forward drive range and is established by grounding the stator for forward drive operation of the turbine. The turbine is clutched to the second sleeve shaft to drive the sun gear and the turbine driven first sleeve shaft is clutched to the ring gear. Both the sun gear and ring gear are thereby driven by the turbine at the same speed and the planetary gear set is thus effectively locked up to provide a direct drive to the output planet carrier. Under these conditions the output planet carrier and the first sleeve shaft which provides the turbine power take-off both rotate at the same speed which is turbine speed while the prime mover power take-off shaft continues to rotate at prime mover speed.

The reverse drive range is a conditioned "stator-reverse" type of torque converter operation and is established by clutching the first sleeve shaft to the ring gear and braking the ring gear so that the turbine is effectively grounded and becomes the reaction member of the torque converter and the ring gear becomes the reaction member of the planetary gear set. The stator is not grounded under these conditions and is clutched to the second sleeve shaft to drive the sun gear in reverse by virtue of the conditioned reversal of operation between the stator and the turbine thereby driving the output planet carrier in reverse at a reduced speed. Under these conditions, the prime mover power take-off shaft continues to rotate at prime mover speed.

The converter lockup clutch can be engaged to provide economy of operation in each of the forward drive ranges described above.

It is an object of this invention to provide a new and improved transmission.

It is another object of this invention to provide a new and improved gearing arrangement employing a single planetary gear set providing at least three forward speed ranges and a reverse speed range.

It is another object of this invention to provide a transmission having a new and improved torque converter and single planetary gear set arrangement providing three forward speeds and reverse.

It is another object of this invention to provide a transmission having a three element torque converter providing turbine drive to a single planetary gear set for three different forward drive ranges and providing stator drive to the single planetary gear set for a reverse drive range.

It is another object of this invention to provide a transmission employing a three element torque converter having a turbine providing drive to a turbine power take-off and transmission drive to a single planetary gear set for three different forward transmission drive ranges and a stator providing transmission drive to the single planetary gear set for a reverse transmission drive range.

It is another object of this invention to provide a transmission employing a prime mover driven torque converter in combination with range gearing having a single planetary gear set, a prime mover power take-off extending centrally through the converter and planetary gear set, the converter having a turbine providing drive for a turbine power take-off extending centrally through the converter and planetary gear set and transmission drive to the planetary gear set for three different forward transmission drive ranges with final transmission drive to an off-the-side transmission output and the torque converter having a stator providing drive to the planetary gear set for a reverse transmission drive range with final transmission drive to the off-the-side transmission output.

It is another object of this invention to provide a transmission employing a three element torque converter having a turbine providing transmission drive in a forward drive direction to the sun gear of a single planetary gear set with planet carrier output in a low drive range, transmission drive in the forward drive direction to the ring gear of the planetary gear set with planet carrier output in an intermediate drive range and transmission drive in the forward drive direction to both the sun gear and ring gear to provide a direct drive with planet carrier output, the torque converter having a stator providing transmission drive in the reverse drive direction to the sun gear with planet carrier output in a reverse drive range.

It is another object of this invention to provide a transmission having an input driving a torque converter having a pump, a turbine and a stator, the input being directly connected to an input power take-off shaft, the turbine being directly connected to a first sleeve shaft providing transmission drive to a first clutch and also a turbine power take-off, the turbine also being connectible by a second clutch to a second sleeve shaft which drives the sun gear of a planetary gear set, the first sleeve shaft and input power take-off shaft extending through the second sleeve shaft, planetary pinions meshing with the sun gear and a ring gear and being mounted on an output planet carrier which drives through a gear train an off-the-side transmission output shaft, the ring gear being selectively held stationary in a low drive range and a reverse drive range or drivingly connected to the turbine by engagement of the first clutch in an intermediate drive range and a high drive range, the stator being held against reverse rotation by a one-way brake in the low, intermediate and high drive ranges for turbine drive to the sun gear in the low drive range, turbine drive to the ring gear in the intermediate drive range and turbine drive to both the sun gear and ring gear in the high drive range, the sun gear being optionally connectible with the one-way brake and to ground in the intermediate drive range, the turbine being connectible to ground in the reverse drive range and the stator being connectible with the second sleeve shaft to provide stator drive to the sun gear in the reverse drive range.

It is another object of this invention to provide a transmission employing an input driving a torque converter having a pump, a turbine and a stator, and a single planetary gear set having a sun gear, a ring gear and an output planet carrier, the stator in a low forward drive range providing reaction by connection with a grounded one-way brake and the turbine being clutched to the sun gear to drive the sun gear with the ring gear being hold for reaction and output by the output planet carrier to an off-the-side transmission output shaft with transmission output being derived at the transmission output shaft, input power take-off directly from the input centrally through the transmission and turbine power take-off centrally through the transmission, the turbine in an intermediate drive range being clutched to the ring gear to drive the ring gear, the sun gear being clutched to the grounded one-way brake of the stator to prevent reverse rotation or optionally held stationary by a brake for downhill braking output via the output planet carrier to the transmission output shaft with transmission output being derived at the transmission output shaft, input power take-off centrally through the transmission and turbine power take-off centrally through the transmission, the turbine in a high drive range being clutched to the ring gear to drive the ring gear and clutched to the sun gear to drive the sun gear whereby the planetary gear set is locked up, planet carrier output which is by direct drive from the turbine with transmission output being derived at the transmission output shaft, input power take-off centrally through the transmission and turbine power take-off centrally through the transmission, and the turbine in a reverse drive range being grounded to become a reaction member of the torque converter, the stator being clutched to the sun gear to drive the sun gear in a reverse direction with the ring gear being braked and planet carrier output in the reverse direction to the transmission output shaft with transmission output being derived at the transmission output shaft and input power take-off centrally through the transmission, and a lockup clutch to clutch the turbine to the pump to provide converter lock up for economy of operation in the low, intermediate and high drive ranges.

These and other objects of the invention will be more apparent from the following description of the preferred embodiment of the invention illustrated in the accompanying drawing in which:

A diagrammatic view of a transmission according to the invention is shown.

The transmission shown in the drawing has a three element hydrodynamic torque converter unit generally designated at 10 of which only the upper half is shown and range gearing having a single planetary gear set generally designated at 12 all located in a transmission housing generally designated at 14. The longitudinal axis of the transmission may extend transversely of the longitudinal axis of the vehicle, not shown, such as where a front wheel drive is employed or where the engine and transmission are located in the rear of the vehicle for rear wheel drive and may also extend longitudinally of the vehicle in the more conventional manner.

An input shaft 16 which is rotatably mounted in suitable bearings, not shown, and which can be driven by any suitable prime mover, such as an internal combustion engine, not shown, is directly connected to an engine or input power take-off shaft 17 and by a pump housing 18 to a vaned pump or impeller 19 of the converter 10. The pump housing 18 generally provides the rotating torque converter housing enclosing the torque converter blading which in addition to the vaned pump 19 includes a vaned turbine 21 and a vaned stator 22. The turbine 21 is directly connected by a drum 24 to a first sleeve shaft 26 through which the engine power take-off shaft 17 extends and may also be connected by drum 24 and a selectively engageable clutch generally designated at 28 to a second sleeve shaft 29 through which both the first sleeve shaft 26 and the engine power take-off shaft 17 extend. The stator 22 is rigidly mounted on a hub 30 which is prevented from rotating in a direction opposite the forward direction of rotation of the pump 19 by a one-way engaging device or brake 31 when the one-way brake 31 is grounded to the transmission housing 14 by the engagement of a ground brake generally designated at 32. A converter lockup clutch generally designated at 35 when engaged prevents relative rotation between the drum 24 and pump housing 18 and thus prevents relative rotation between the turbine 21 and pump 19 to provide converter lock up and a direct drive between the input shaft 16 and drum 24.

Referring now to the range gearing, the planetary gear set 12 has a planet carrier 33 having a hub 34 which is rotatably supported in a vertically extending wall section or web 36 of the transmission housing 14. The engine power take-off shaft 17 and the first and second sleeve shafts 26 and 29 extend through the hub 34 and a plurality of planetary pinions 38 rotatably mounted on the planet carrier 33 mesh with a sun gear 39 which is directly connected to the right-hand end of the second sleeve shaft 29 and mesh with a ring gear 41 which may be either held stationary by the engagement of a brake generally designated at 42 or connected by the engagement clutch generally designated at 44 to a drive connection 46 which is rigidly connected to the first sleeve shaft 26 at a point where the first sleeve shaft 26 projects beyond the planetary gear set 12. A brake 49 when engaged holds stationary a drive connection 51 which is rigidly connected to the second sleeve shaft 29 to thus hold the sun gear 39 stationary, and a clutch generally designated at 52 when engaged prevents relative rotation between the drive connection 51 and a drive connection 54 which is rigidly connected to the hub 30 mounting the stator 22 to thus prevent relative rotation between sun gear 39 and the rigidly connected hub 30 and stator 22.

Rigidly secured to the planet carrier hub 34 at a point leftwardly of web 36 is a drive spur gear 56 which is in mesh with a driven spur gear 58. The driven spur gear 58 is rigidly connected to a transmission output shaft 59 which extends parallel of the shafts 17, 26 and 29 and is rotatably supported by suitable bearings in a radially extended portion 61 of transmission housing 14.

Describing now the operation of the transmission, the input shaft 16 when driven in a forward direction rotates the pump housing 18 and the engine power take-off shaft 17 in the forward direction and at the same speed. The toroidal circuitry provided by the pump 19, turbine 21 and stator 22 is filled with a fluid and with the pump 19 being driven in the forward direction by the input shaft 16, the fluid moves toroidally exiting from the pump 19 and entering the turbine 21, exiting from the turbine 21 and entering the stator 22, and exiting from the stator 22 to be returned to the pump 19 for a subsequent cycle. The pump 19 discharges fluid to the turbine 21 in the same direction as the pump 19 is rotated to rotate the turbine 21 in the forward direction and the stator 22 discharges fluid in the same direction as the pump 19 rotates when the stator 22 is prevented from reverse rotation and serves as the reaction member. On the other hand, when the turbine 21 is held stationary to prevent forward rotation and the stator 22 is freed for reverse rotation the pump 19 discharges fluid to the turbine 21 in the same direction as the pump 19 is rotated and the turbine 21 which is prevented from rotating forwardly serves as the reaction member and discharges fluid to the stator 22 in a direction opposite that of rotation of the pump 19 so that the stator 22 which is freed for reverse rotation is caused to rotate in the reverse direction. By selective engagement of the clutches and/or brakes, the transmission described above provides at least three forward speeds and reverse.

In the first and lowest forward drive range which corresponds to the greatest reduction drive and the greatest torque multiplication available in the transmission, the ground brake 32 is engaged to ground the one-way brake 31. The torque converter 10 then operates in the usual manner with the stator 22 being controlled through the grounded one-way brake 31 and the clutch 28 is engaged so that the drive is through the turbine 21 and second sleeve shaft 29 to the sun gear 39. The brake 42 is engaged to hold stationary the ring gear 41 which then acts as a reaction member. The sun gear 39 rotates in the forward direction the same as the turbine 21 and causes the pinions 38 to orbit in the ring gear 41 and since the ring gear 41 is held stationary the planet carrier 33 which is an output planet carrier is rotated in the forward direction and at a reduced speed relative to the forwardly rotating second sleeve shaft 29. The planet carrier 33 drives through spur gears 56 and 58, the transmission output shaft 59 which in this instance is caused to rotate in a direction opposite that of planet carrier 33 which it will be understood could be caused to rotate in the same direction by the provision of an idler gear between the spur gears 56 and 58.

In the second forward drive range which is an intermediate drive range, the brake 32 remains engaged to ground the one-way brake 31 and the clutch 28 and brake 42 are disengaged. The torque converter operates in the usual manner with the stator 22 being controlled through the grounded one-way brake 31 and the turbine 21 rotates in the forward direction to drive the first sleeve shaft 26. The clutch 44 is engaged so that drive is then from the turbine 21 to the ring gear 41 whereby the ring gear 41 is caused to rotate in the forward direction. The clutch 52 is engaged so that the sun gear 39 is held against reverse rotation by the grounded one-way brake 31 and with the ring gear 41 rotating in the forward direction and the sun gear 39 being prevented against reverse rotation, the pinions 38 orbit in the forward direction about the sun gear 39 and cause the planet carrier 33 to rotate in the forward direction at a reduced speed relative to the forwardly rotating first sleeve shaft 26 and in a speed range higher than that available in the first forward drive range. The planet carrier 33 then drives through the spur gears 56 and 58 the transmission output shaft 59. In this drive range, when the converter reaches its coupling condition and when the reaction force of the sun gear 39 becomes less than the forward torque of the stator 22, the stator 22 will overrun the grounded one-way brake 31 and also act to drive sun gear 39 forwardly. Thus, in coupling operation the upper speed range in intermediate drive approaches that of the highest drive range which is a locked-up gear drive as will be subsequently explained and provides for a smooth transition shift.

The brake 49 is an optional intermediate hold brake and when engaged connects the sun gear 39 and stator 22 to ground for downhill braking in the intermediate drive range. Engagement of the brake 49 to hold the sun gear 39 and stator 22 prevents their overrunning in the forward direction under downhill braking conditions which would otherwise be permitted to occur since the grounded one-way brake 31 only prevents reverse rotation. Thus, engagement of the brake 49 permits the torque converter 10 to provide a downhill braking action to the prime mover and in addition, since the stator 22 is prevented from overrunning, the converter is also conditioned to provide a churn brake effect.

The third forward drive range and the highest drive range locks out the planetary gear set 12 to provide a direct drive to the planet carrier 33. The brake 32 remains engaged to ground the one-way brake 31, the clutch 44 remains engaged so that the ring gear 41 is drivingly connected to the first sleeve shaft 26 and the brake 49 and clutch 52 are disengaged. The turbine 21 drives the first sleeve shaft 26 in the forward direction and the clutch 28 is engaged so that the turbine 21 also drives the second sleeve shaft 29 and connected sun gear 39 in the forward direction and at the same speed as the first sleeve shaft 26 which is drivingly connected to the ring gear 41. With the ring gear 41 and the sun gear 39 both being driven at the same speed by the turbine 21, the planetary gear set 12 is effectively locked up and the planet carrier 33 rotates in the forward direction and at the same speed as the first and second sleeve shafts 26 and 29 and turbine 21. The output planet carrier 33 then drives through the spur gears 56 and 58 the transmission output shaft 59.

The lockup clutch 35 can be engaged to lock the turbine 21 to the pump 19 and provide a direct drive between input shaft 16 and the drum 24 for economy of operation in each of the forward drive ranges, namely, low intermediate and high.

The reverse drive range is a conditioned "stator-reverse" type or torque converter operation. To establish the reverse drive range, the brake 42 is engaged to hold stationary the ring gear 41 and the clutch 44 is engaged thus effectively holding stationary the first sleeve shaft 26 which is directly connected to the turbine 21 so that the turbine 21 then becomes the reaction member of the torque converter 10. The ground brake 32 is disengaged so that the one-way brake 31 is not grounded and the stator 22 is driven in the reverse direction. The clutch 52 is engaged and stator drive in reverse is then to the sun gear 39 which is thereby driven in the reverse direction. Since the ring gear 41 is grounded by the engagement of the brake 42, the reverse rotation of the sun gear 39 causes the pinions 38 to orbit in the reverse direction in the ring gear 41 and drive the planet carrier 33 in the reverse direction at a reduced speed relative to the speed of rotation of the stator 22. The planet carrier 33 then drives through the spur gears 56 and 58 the transmission output shaft 59.

The transmission is conditioned for neutral by engaging the ground brake 32 and the brake 42, all other brakes and clutches being disengaged, to control the rotational speeds of the transmission elements.

The following table lists the engagements of the clutches and brakes to establish the three forward drive ranges, reverse drive range and neutral:

|  | Clutch 35 | Clutch 28 | Clutch 52 | Clutch 44 | Brake 32 | Brake 49 | Brake 42 |
|---|---|---|---|---|---|---|---|
| Low | Optional x | x |  |  | x |  | x |
| Intermediate | Optional x |  | x | x | x | Optional x |  |
| High | Optional x | x |  | x | x |  |  |
| Reverse |  |  | x | x |  |  | x |
| Neutral |  |  |  |  | x |  | x |

The manner of arrangement of the torque converter 10 and the planetary gear set 12 as shown and described provides an extremely short transmission unit which is especially desirable where the accommodating space in the vehicle is limited. Also engine and turbine power take-offs are provided with no added gearing which may be employed to provide drive to accessory equipment such as tail gates, power lifts and the like. In neutral both of the power take-offs are available when they are most needed since the engine power taffe-off shaft 17 will be rotating at engine speed and by engagement of the lockup clutch 35, the first sleeve shaft 26 will also rotate at engine speed. In the three forward drive ranges, namely, low, intermediate and high, the engine power take-off shaft 17 provides an engine or input power take-off at engine speed and the turbine driven first sleeve shaft 26 provides a turbine power take-off at turbine speed, such power take-offs being made available at points on the engine power take-off shaft 17 and the first sleeve shaft 26 where these shafts extend out through the right-hand end of the transmission housing 14. In addition, the first sleeve shaft 26 providing the turbine power take-off may also provide a second engine power take-off by engagement of the lockup clutch 35 in each of the forward drive ranges. In the reverse drive range, the engine power take-off shaft 17 continues to provide an engine power take-off at engine speed. Furthermore, the off-the-side transmission output shaft 59 by its location is advantageous where the longitudinal axis of the transmission is located transverse of the longitudinal axis of the vehicle such as in front wheel drive vehicles and in vehicles where the engine and transmission are located in the rear of the vehicle for rear wheel drive.

The above-described preferred embodiment is illustrative of the invention and it will be appreciated that it may be modified within the scope of the appended claims.

I claim:
1. In a transmission the combination of
(a) a hydrodynamic torque converter comprising a pump, a turbine and a stator, a planetary gear set comprising drivingly interconnected first, second and third gearing elements,
(b) said pump when operating in a forward direction being effective to drive said turbine in said forward direction when said stator is prevented from being driven in a reverse direction which is opposite said forward direction and to drive said stator in said reverse direction when said turbine is prevented from being driven in said forward direction,
(c) said second gearing element being a transmission output, said first gearing element when driven in one direction being effective to drive said second gearing element in said one direction at one reduced speed relative to said first gearing element when said third gearing element is braked, said third gearing element when driven in said one direction being effective to drive said second gearing element in said one direction at a reduced speed relative to said third gearing element less than said one reduced speed when said first gearing element is braked, said first and third gearing elements when conjointly driven in said one direction at the same speed being effective to drive said second gearing element in said one direction at the same speed as said first and third gearing elements, said first gearing element when driven in said opposite direction being effective to drive said second gearing element in said opposite direction at a reduced speed relative to said first gearing element when said third gearing element is braked,
(d) and a one-way brake operatively connected to said stator effective when grounded to permit said stator to drive in said forward direction and prevent said stator from being driven in said reverse direction, a first brake effective when engaged to ground said one-way brake, a first clutch effective when engaged to connect said turbine to said first gearing element, a second clutch effective when engaged to connect said turbine to said third gearing element, a second brake effective when engaged to brake said third gearing element and to brake said turbine when said second clutch is engaged, and a third clutch effective when engaged to connect said first gearing element to said stator and to said one-way brake so that said first gearing element is driven in said opposite direction when said stator is driven in said reverse direction and said first gearing element is prevented from being driven in said opposite direction when said one-way brake is grounded.

2. In a transmission the combination of
(a) a hydrodynamic torque converter comprising a pump, turbine and a stator, a planetary gear set comprising drivingly interconnected first, second and third gearing elements,
(b) said pump when operating in a forward direction being effective to drive said turbine in said forward direction when said stator is prevented from being driven in a reverse direction which is opposite said forward direction and to drive said stator in said reverse direction when said turbine is prevented from being driven in said forward direction,
(c) said second gearing element being a transmission output, said first gearing element when driven in one direction being effective to drive said second gearing element in said one direction at one reduced speed relative to said first gearing element when said third gearing element is braked, said third gearing element when driven in said one direction being effective to drive said second gearing element in said one direction at a reduced speed relative to said third gearing element less than said one reduced speed when said first gearing element is prevented from being driven in a direction opposite said one direction and when said first gearing element is braked, said first and third gearing elements when conjointly driven in said one direction at the same speed being effective to drive said second gearing element in said one direction at the same speed as said first and third gearing elements, said first gearing element when driven in said opposite direction being effective to drive said second gearing element in said opposite direction at a reduced speed relative to said first gearing element when said third gearing element is braked,
(d) and a one-way brake operatively connected to said stator effective when grounded to permit said stator to drive in said forward direction and prevent said stator from being driven in said reverse direction, a first brake effective when engaged to ground said one-way brake, a first clutch effective when engaged to connect said turbine to said first gearing element, a second clutch effective when engaged to connect said turbine to said third gearing element, a second brake effective when engaged to brake said third gearing element and to brake said turbine when said second clutch is engaged, a third brake effective when engaged to brake said first gearing element, and a third clutch effective when engaged to connect said first gearing element to said stator and to said one-way brake so that said first gearing element is driven in said opposite direction when said stator is being driven in said reverse direction and said first gearing element is prevented from being driven in said opposite direction when said one-way brake is grounded.

3. The transmission set forth in claim 2 and a clutch effective when engaged to connect said turbine to said pump.

4. In a transmission the combination of
(a) a hydrodynamic torque converter comprising a pump, a turbine and a stator, a planetary gear set comprising drivingly interconnected first, second and third gearing elements,
(b) said pump when operating in a forward direction being effective to drive said turbine in said forward direction when said stator is prevented from being driven in a reverse direction which is opposite said forward direction and to drive said stator in said reverse direction when said turbine is prevented from being driven in said forward direction,
(c) said second gearing element being a transmission output, said first gearing element when driven in one direction being effective to drive said second gearing element in said one direction at one reduced speed relative to said first gearing element when said third gearing element is braked, said third gearing element when driven in said one direction being effective to drive said second gearing element in said one direction at a reduced speed relative to said third gearing element less than said one reduced speed when said first gearing element is prevented from being driven in a direction opposite said one direction and when said first gearing element is braked, said first and third gearing elements when conjointly driven in said one direction at the same speed being effective to drive said second gearing element in said one direction at the same speed as said first and third gearing elements, said first gearing element when driven in said opposite direction being effective to drive said second gearing element in said opposite direction at a reduced speed relative to said first gearing element when said third gearing element is braked,
(d) a one-way brake operatively connected to said stator effective when grounded to permit said stator to drive in said forward direction and prevent said stator from being driven in said reverse direction, a first brake effective when engaged to ground said one-way brake, a first clutch effective when engaged to connect said turbine to said first gearing element, a second clutch effective when engaged to connect said turbine to said third gearing element, a second brake effective when engaged to brake said third gearing element and to brake said turbine when said second clutch is engaged, a third brake effective when engaged to brake said first gearing element, and a third clutch effective when engaged to connect said first gearing element to said stator and to said one-way brake so that said first gearing element is driven in said opposite direction when said stator is being driven in said reverse direction and said first gearing element is prevented from being driven in said opposite direction when said one-way brake is grounded,
(e) and an input power take-off shaft fixed for rotation with said pump and extending centrally through said planetary gear set and a turbine power take-off sleeve shaft fixed for rotation with said turbine, said turbine power take-off sleeve shaft being received on said input power take-off shaft and extending centrally through said planetary gear set.

5. In a transmission the combination of
(a) an input member, an output member, a hydrodynamic torque converter comprising a pump connected to said input member, a turbine and a stator, a planetary gear set comprising a sun gear, a ring gear and a planet carrier rotatably supporting planetary pinions in mesh with said sun gear and said ring gear,
(b) an input power take-off shaft connected to said input member and extending centrally through said hydrodynamic torque converter and said planetary gear set, a first sleeve shaft connected to said turbine, said first sleeve shaft being received on said input power take-off shaft and extending through said planetary gear set to provide a turbine power take-off, a second sleeve shaft received on said first sleeve shaft and connected to said sun gear,
(c) a one-way brake connected to said stator, a first brake effective when engaged to ground said one-way brake, a first clutch effective when engaged to connect said turbine to said second sleeve shaft, a second brake effective when engaged to ground said ring gear,
(d) and drive means operatively connecting said output member to said planet carrier.

6. In a transmisison the combination of
(a) an input member, an output member, a hydrodynamic torque converter comprising a pump connected to said input member, a turbine and a stator, a planetary gear set comprising a sun gear, a ring gear and a planet carrier rotatably supporting planetary pinions in mesh with said sun gear and said ring gear,
(b) an input power take-off shaft connected to said input member and extending centrally through said hydrodynamic torque converter and said planetary gear set, a first sleeve shaft connected to said turbine, said first sleeve shaft being received on said input power take-off shaft and extending through said planetary gear set to provide a turbine power take-off, a second sleeve shaft received on said first sleeve shaft and connected to said sun gear,
(c) a one-way brake connected to said stator, a first brake effective when engaged to ground said one-way brake, a first clutch effective when engaged to connect said first sleeve shaft to said ring gear, a second clutch effective when engaged to connect said second sleeve shaft to said one-way brake,
(d) and drive means operatively connecting said output member to said planet carrier.

7. In a transmisison the combination of
(a) an input member, an output member, a hydrodynamic torque converter comprising a pump connected to said input member, a turbine and a stator, a planetary gear set comprising a sun gear, a ring gear and a planet carrier rotatably supporting planetary pinions in mesh with said sun gear and said ring gear,
(b) an input power take-off shaft connected to said input member and extending centrally through said hydrodynamic torque converter and said planetary gear set, a first sleeve shaft connected to said turbine, said first sleeve shaft being received on said power take-off shaft and extending through said planetary gear set to provide a turbine power take-off, a second sleeve shaft received on said first sleeve shaft and connected to said sun gear,
(c) a one-way brake connected to said stator, a first brake effective when engaged to ground said one-way brake, a first clutch effective when engaged to connect said turbine to said second sleeve shaft, a second clutch effective when engaged to connect said first sleeve shaft to said ring gear,
(d) and drive means operatively connecting said output member to said planet carrier.

8. In a transmisison the combination of
(a) an input member, an output member, a hydrodynamic torque converter comprising a pump connected to said input member, a turbine and a stator, a planetary gear set comprising a sun gear, a ring gear and a planet carrier rotatably supporting planetary pinions in mesh with said sun gear and said ring gear,
(b) an input power take-off shaft connected to said input member and extending centrally through said hydrodynamic torque converter and said planetary gear set, a first sleeve shaft connected to said turbine, said first sleeve shaft being received on said power take-off shaft, a second sleeve shaft received on said first sleeve shaft and connected to said sun gear,
(c) a first clutch effective when engaged to connect said first sleeve shaft to said ring gear, a first brake effective when engaged to ground said ring gear, a second clutch effective when engaged to connect said second sleeve shaft to said stator,
(d) and drive means operatively connecting said output member to said planet carrier.

9. In a transmisison the combination of
(a) an input member, an output member, a hydrodynamic torque converter comprising a pump connected to said input member, a turbine and a stator, a planetary gear set comprising a sun gear, a ring gear and a planet carrier rotatably supporting planetary pinions in mesh with said sun gear and said ring gear,
(b) a one-way brake connected to said stator, a first brake effective when engaged to ground said one-way brake, a first clutch effective when engaged to connect said turbine to said sun gear, a second clutch effective when engaged to connect said turbine to said ring gear, a second brake effective when engaged to ground said ring gear, a third brake effective when engaged to round said sun gear, a third clutch effective when engaged to connect said sun gear to said one-way brake and said stator,
(c) and drive means operatively connecting said output member to said planet carrier at a point intermediate said hydrodynamic torque converter and said planetary gear set.

10. In a transmisison the combination of
(a) an input member, an output member, a hydrodynamic torque converter comprising a pump connected to said input member, a turbine and a stator, a planetary gear set comprising a sun gear, a ring gear and a planet carrier rotatably supporting planetary pinions in mesh with said sun gear and said ring gear,
(b) an input power take-off shaft connected to said input member and extending centrally through said hydrodynamic torque converter and said planetary gear set, a first sleeve shaft connected to said turbine, said first sleeve shaft being received on said input power take-off shaft and extending through said planetary gear set to provide a turbine power take-off, a second sleeve shaft received on said first sleeve shaft and connected to said sun gear,
(c) a one-way brake connected to said stator, a first brake effective when engaged to ground said one-way brake, a first clutch effective when engaged to connect said turbine to said second sleeve shaft, a second clutch effective when engaged to connect first sleeve shaft to said ring gear, a second brake effective when engaged to ground said ring gear, a third brake effective when engaged to ground said second sleeve shaft, a third clutch effective when engaged to connect said second sleeve shaft to said one-way brake and said stator,
(d) said planet carrier having a central axis, said output member having an axis spaced from and parallel to the central axis of said planet carrier,
(e) and a gear train operatively connecting said output member to said planet carrier at a point intermediate said hydrodynamic torque converter and said planetary gear set.

11. In a transmission the combination of
(a) an input member, an output member, a hydrodynamic torque converter comprising a pump driven by said input member, a turbine and a stator, a planetary gear set comprising a sun gear, a ring gear and a planet carrier rotatably supporting planetary pinions meshing with said sun gear and said ring gear,
(b) said pump when driven in a forward direction being effective to drive said turbine in said forward direction when said stator is prevented from being driven in a reverse direction which is opposite said forward direction,
(c) a one-way brake connected to said stator effective when grounded to prevent said stator from being driven in said reverse direction and permitting said stator to be driven in said forward direction, a first brake effective when engaged to ground said one-way brake,
(d) one sleeve shaft connected to said sun gear, a second brake effective when engaged to ground said ring gear, a first clutch effective when engaged to connect said turbine to said one sleeve shaft whereby when said first brake, said second brake and said first clutch are engaged and said pump is being driven in said forward direction, said turbine is effective to drive said planet carrier in said forward direction in a forward drive range and at a reduced speed relative to said turbine, (e) another sleeve shaft connected to said turbine and extending centrally through said one sleeve shaft and said planetary gear set, (f) said planet carrier having a central axis, said output member having an axis radially spaced from the axis of said planet carrier, drive means drivingly connecting said output member to said planet carrier at a point intermediate said hydrodynamic torque converter and said planetary gear set, (g) and an input power take-off shaft connected to said input member and extending through said another sleeve shaft to provide an input power take-off, said another sleeve shaft providing a turbine power take-off in said forward drive range.

12. In a transmission the combination of (a) an input member, an output member, a hydrodynamic torque converter comprising a pump driven by said input member, a turbine and a stator, a planetary gear set comprising a sun gear, a ring gear and a planet carrier rotatably supporting planetary pinions meshing with said sun gear and said ring gear, (b) said pump when driven in a forward direction being effective to drive said turbine in said forward direction when said stator is prevented from being driven in a reverse direction which is opposite said forward direction, (c) a one-way brake connected to said stator effective when grounded to prevent said stator from being driven in said reverse direction and permitting said stator to be driven in said forward direction, a first brake effective when engaged to ground said one-way brake, (d) one sleeve shaft connected to said sun gear, another sleeve shaft connected to said turbine and extending centrally through said one sleeve shaft and said planetary gear set, a first clutch effective when engaged to connect said another sleeve shaft to said ring gear, a second clutch effective when engaged to connect said one sleeve shaft and connected said sun gear to said one-way brake so that when said first brake is engaged said one-way brake is effective to prevent said sun gear from being driven in said reverse direction whereby when said first brake, said first clutch and said second clutch are engaged and said pump is being driven in said forward direction said turbine is effective to drive said planet carrier in said forward direction in a forward drive range and at a reduced speed relative to said turbine, (e) said planet carrier having a central axis, said output member having an axis radially spaced from the axis of said planet carrier, drive means drivingly connecting said output member to said planet carrier at a point intermediate said hydrodynamic torque converter and said planetary gear set, (f) and an input power take-off shaft connected to said input member and extending through said another sleeve shaft to provide an input power take-off, said another sleeve shaft providing a turbine power take-off in said forward drive range.

13. The transmission set forth in claim 12 and a second brake effective when engaged to ground said one sleeve shaft and connected said sun gear whereby when said first brake, said first clutch and said second brake are engaged and said pump is being driven in said forward direction said turbine is effective to drive said planet carrier in said forward direction in said second forward drive range.

14. In a transmission the combination of (a) an input member, an output member, a hydrodynamic torque converter comprising a pump driven by said input member, a turbine and a stator, a planetary gear set comprising a sun gear, a ring gear and a planet carrier rotatably supporting planetary pinions meshing with said sun gear and said ring gear, (b) said pump when driven in a forward direction being effective to drive said turbine in said forward direction when said stator is prevented from being driven in a reverse direction which is opposite said forward direction, (c) a one-way brake connected to said stator effective when grounded to prevent said stator from being driven in said reverse direction and permitting said stator to be driven in said forward direction, a first brake effective when engaged to ground said one-way brake, (d) one sleeve shaft connected to said sun gear, a first clutch effective when engaged to connect said turbine to said one sleeve shaft, another sleeve shaft connected to said turbine and extending centrally through said one sleeve shaft and said planetary gear set, a second clutch effective when engaged to connect said another sleeve shaft to said ring gear, said turbine being effective, when said pump is being driven in said forward direction and said first brake, said first clutch and said second clutch are engaged, to drive said planet carrier in said forward direction in a forward drive range and at the same speed as said turbine, (e) said planet carrier having a central axis, said output member having an axis radially spaced from the axis of said planet carrier, drive means drivingly connecting said output member to said planet carrier at a point intermediate said hydrodynamic torque converter and said planetary gear set, (f) and an input power take-off shaft connected to said input member and extending through said another sleeve shaft to provide an input power take-off, said another sleeve shaft providing a turbine power take-off in said forward drive range.

15. In a transmission the combination of (a) an input member, an output member, a hydrodynamic torque converter comprising a pump driven by said input member, a turbine and a stator, a planetary gear set comprising a sun gear, a ring gear and a planet carrier rotatably supporting planetary pinions meshing with said sun gear and said ring gear, (b) said pump when driven in a forward direction being effective to drive said stator in a reverse direction which is opposite said forward direction when said turbine is prevented from being driven in said forward direction, (c) one sleeve shaft connected to said sun gear, a first brake effective when engaged to ground said ring gear, another sleeve shaft connected to said turbine and extending centrally through said one sleeve shaft and said planetary gear set, a first clutch effective when engaged to connect said another sleeve shaft to said ring gear, a second clutch effective when engaged to connect said one sleeve shaft and connected said sun gear to said stator whereby when said first brake, said first clutch and said second clutch are engaged and said pump is being driven in said forward direction said stator is effective to drive said panet carrier in said reverse direction in a reverse drive range and at a reduced speed relative to said stator, (d) said planet carrier having a central axis, said output member having an axis radially spaced from the axis of said planet carrier, drive means drivingly connecting said output member to said planet carrier at a point intermediate said hydrodynamic torque converter and said planetary gear set, (e) and an input power take-off shaft connected to said input member and extending through said another sleeve shaft to provide an input power take-off.

16. In a transmission the combination of
(a) an input member, an output member, a hydrodynamic torque converter comprising a pump driven by said input member, a turbine and a stator, a planetary gear set comprising a sun gear, a ring gear and a planet carrier rotatably supporting planetary pinions meshing with said sun gear and said ring gear,
(b) said pump when driven in a forward direction being effective to drive said turbine in said forward direction when said stator is prevented from being driven in a reverse direction which is opposite said forward direction and to drive said stator in said reverse direction when said turbine is prevented from being driven in said forward direction,
(c) a one-way brake connected to said stator effective when grounded to prevent said stator from being driven in said reverse direction and permitting said stator to be driven in said forward direction, a first brake effective when engaged to ground said one-way brake,
(d) one sleeve shaft connected to said sun gear, a second brake effective when engaged to ground said ring gear, a first clutch effective when engaged to connect said turbine to said one sleeve shaft whereby when said first brake, said second brake and said first clutch are engaged and said pump is being driven in said forward direction, said turbine is effective to drive said planet carrier in said forward direction in a first forward drive range and at a reduced speed relative to said turbine,
(e) another sleeve shaft connected to said turbine and extending centrally through said one sleeve shaft and said planetary gear set, a second clutch effective when engaged to connect said another sleeve shaft to said ring gear, a third clutch effective when engaged to connect said one sleeve shaft and connected said sun gear to said one-way brake so that when said first brake is engaged said one-way brake is effective to prevent said sun gear from being driven in said reverse direction whereby when said first brake, said second clutch and said third clutch are engaged and said pump is being driven in said forward direction said turbine is effective to drive said planet carrier in said forward direction in a second forward drive range and at a reduced speed relative to said turbine less than the reduced speed provided in said first forward drive range,
(f) said turbine being effective, when said pump is being driven in said forward direction and said first brake, said first clutch and said second clutch are engaged, to drive said planet carrier in said forward direction in a third forward drive range and at the same speed as said turbine,
(g) said third clutch also being effective when engaged to connect said one sleeve shaft and connected said sun gear to said stator whereby when said second brake, said second clutch and said third clutch are engaged and said pump is being driven in said forward direction said stator is effective to drive said planet carrier in said reverse direction in a reverse drive range and at a reduced speed relative to said stator,
(h) said planet carrier having a central axis, said output member having an axis radially spaced from the axis of said planet carrier, drive means drivingly connecting said output member to said planet carrier at a point intermediate said hydrodynamic torque converter and said planetary gear set,
(i) and an input power take-off shaft connected to said input member and extending through said another sleeve shaft to provide an input power take-off, a fourth clutch effective when engaged to connect said input member to said another sleeve shaft, said another sleeve shaft providing a turbine power take-off in said first, second and third forward drive ranges and also another input power take-off when only said fourth clutch is engaged.

17. In a transmission the combination of
(a) an input member, an output member, a hydrodynamic torque converter comprising a pump driven by said input member, a turbine and a stator, a planetary gear set comprising a sun gear, a ring gear and a planet carrier rotatably supporting planetary pinions meshing with said sun gear and said ring gear,
(b) said pump when driven in a forward direction being effective to drive said turbine in said forward direction when said stator is prevented from being driven in a reverse direction which is opposite said forward direction and to drive said stator in said reverse direction when said turbine is prevented from being driven in said forward direction,
(c) a one-way brake connected to said stator effective when grounded to prevent said stator from being driven in said reverse direction and permitting said stator to be driven in said forward direction, a first brake effective when engaged to ground said one-way brake,
(d) one sleeve shaft connected to said sun gear, a second brake effective when engaged to ground said ring gear, a first clutch effective when engaged to connect said turbine to said one sleeve shaft whereby when said first brake, said second brake and said first clutch are engaged and said pump is being driven in said forward direction, said turbine is effective to drive said planet carrier in said forward direction in a first forward drive range and at a reduced speed relative to said turbine,
(e) another sleeve shaft connected to said turbine and extending centrally through said one sleeve shaft and said planetary gear set, a second clutch effective when engaged to connect said another sleeve shaft to said ring gear, a third clutch effective when engaged to connect said one sleeve shaft and connected said sun gear to said one-way brake so that when said first brake is engaged said one-way brake is effective to prevent said sun gear from being driven in said reverse direction whereby when said first brake, said second clutch and said third clutch are engaged and said pump is being driven in said forward direction said turbine is effective to drive said planet carrier in said forward direction in a second forward drive range and at a reduced speed relative to said turbine less than the reduced speed provided in said first forward drive range,
(f) a third brake effective when engaged to ground said one sleeve shaft and connected said sun gear whereby when said first brake, said second clutch and said third brake are engaged and said pump is being driven in said forward direction said turbine is effective to drive said planet carrier in said forward direction in said second forward drive range,
(g) said turbine being effective, when said pump is being driven in said forward direction and said first brake, said first clutch and said second clutch are engaged, to drive said planet carrier in said forward direction in a third forward drive range and at the same speed as said turbine,
(h) said third clutch also being effective when engaged to connect said one sleeve shaft and connected said sun gear to said stator whereby when said second brake, said second clutch and said third clutch are engaged and said pump is being driven in said forward direction said stator is effective to drive said planet carrier in said reverse direction in a reverse drive range and at a reduced speed relative to said stator,
(i) a converter lockup clutch effective when engaged to connect said turbine and connected said another sleeve shaft to said pump,
(j) said planet carrier having a central axis, said output member having an axis spaced from and parallel to the axis of said planet carrier, a gear train drivingly connecting said output member to said planet carrier at a point intermediate said hydrodynamic torque converter and said planetary gear set, (k) and an input power take-off shaft connected to said input member and extending through said another sleeve shaft to provide an input power take-off, said another sleeve shaft providing a turbine power take-off in said first, second and third forward drive ranges and another input power take-off when only said converter lockup clutch is engaged.

18. In a transmission the combination of (a) first input means rotatable in a forward direction, second input means rotatable in a reverse direction which is opposite said forward direction, output means, a planetary gear set comprising drivingly interconnected first, second and third gearing elements, (b) said first gearing element when driven in one direction being effective to drive said second gearing element in one direction at one reduced speed relative to said first gearing element when said third gearing element is braked, said third gearing element when driven in said one direction being effective to drive said second gearing element in said one direction at a reduced speed relative to said third gearing element less than said one reduced speed when said first gearing element is prevented from being driven in a direction opposite said one direction, said first and third gearing elements when conjointly driven in said one direction at the same speed being effective to drive said second gearing element in said one direction at the same speed as said first and third gearing elements, said first gearing element when driven in said opposite direction being effective to drive said second gearing element in said opposite direction at a reduced speed relative to said first gearing element when said third gearing element is braked, (c) and a first clutch effective when engaged to connect said first input means to said first gearing element, a second clutch effective when engaged to connect said first input means to said third gearing element, a one-way brake, a first brake effective when engaged to ground said one-way brake, a third clutch effective when engaged to connect said first gearing element to said second input means and said one-way brake so that said first gearing element is driven in said opposite direction when said second input means is rotating in said reverse direction and said first gearing element is prevented from being driven in said opposite direction when said one-way brake is grounded, a second brake effective when engaged to brake said third gearing element, and drive means drivingly connecting said second gearing element to said output means.

19. In a transmission the combination of (a) first input means rotatable in a forward direction, second input means rotatable in a reverse direction which is opposite said forward direction, output means, a planetary gear set comprising drivingly interconnected first, second and third gearing elements, (b) said first gearing element when driven in one direction being effective to drive said second gearing element in said one direction at one reduced speed relative to said first gearing element when said third gearing element is braked, said third gearing element when driven in said one direction being effective to drive said second gearing element in said one direction at a reduced speed relative to said third gearing element less than said one reduced speed when said first gearing element is prevented from being driven in a direction opposite said one direction and when said first gearing element is braked, said first and third gearing elements when conjointly driven in said one direction at the same speed being effective to drive said second gearing element in said one direction at the same speed as said first and third gearing elements, said first gearing element when driven in said opposite direction being effective to drive said second gearing element in said opposite direction at a reduced speed relative to said first gearing element when said third gearing element is braked, (c) and a first clutch effective when engaged to connect said first input means to said first gearing element, a second clutch effective when engaged to connect said first input means to said third gearing element, a one-way brake operatively connected to said second input means effective when grounded to prevent said second input means from being rotated in said reverse direction, a first brake effective when engaged to ground said one-way brake, a third clutch effective when engaged to connect said first gearing element to said second input means and connected one-way brake so that said first gearing element is driven in said opposite direction when said second input means is rotating in said reverse direction and said first gearing element is prevented from being driven in said opposite direction when said one-way brake is grounded, a second brake effective when engaged to brake said first gearing element, a third brake effective when engaged to brake said third gearing element, and drive means drivingly connecting said second gearing element to said output means.

20. In a transmission the combination of (a) first input means rotatable in a forward direction, second input means rotatable in a reverse direction which is opposite said forward direction, output means, a planetary gear set comprising a sun gear, a ring gear and a planet carrier rotatably supporting planetary pinons in mesh with said sun gear and said ring gear, (b) a first clutch effective when engaged to connect said first input means to said sun gear so that said sun gear is driven in said forward direction when said first input means is rotating in said forward direction, a second clutch effective when engaged to connect said first input means to said ring gear so that said ring gear is driven in said forward direction when said first input means is rotating in said forward direction, a one-way brake operatively connected to said second input means effective when grounded to prevent said second input means from rotating in said reverse direction, a first brake effective when engaged to ground said one-way brake, a third clutch effective when engaged to connect said sun gear to said second input means and connected one-way brake so that said sun gear is driven in said reverse direction when said second input means is rotating in said reverse direction and said sun gear is prevented from being driven in said reverse direction when said one-way brake is grounded, a second brake effective when engaged to brake said sun gear, a third brake effective when engaged to brake said ring gear, (c) and said output means being radially spaced from said planet carrier, drive means drivingly connecting said planet carrier to said output means.

References Cited by the Examiner

UNITED STATES PATENTS

| | | | |
|---|---|---|---|
| 2,414,359 | 1/1947 | Carnagua et al. | 74—189 |
| 2,995,954 | 8/1961 | Burtnett | 74—677 |
| 3,000,234 | 9/1961 | Burtnett | 74—677 X |
| 3,051,017 | 8/1962 | Flinn | 74—677 |

FOREIGN PATENTS 1,221,460  1/1960  France.

DAVID J. WILLIAMOWSKY, *Primary Examiner.*

J. R. BENEFIEL, *Assistant Examiner.*